(12) United States Patent
Peters et al.

(10) Patent No.: US 10,085,459 B2
(45) Date of Patent: Oct. 2, 2018

(54) DEVICE FOR STUNNING POULTRY AND METHOD FOR OPERATING SUCH STUNNING DEVICE

(71) Applicant: Marel Stork Poultry Processing B.V., Boxmeer (NL)

(72) Inventors: Erik Hendrikus Werner Peters, Boxmeer (NL); Hendrikus Anthonius Theresia Petrus Hetterscheid, Boxmeer (NL); Roger Pierre Hubertus Maria Claessens, Nijmegen (NL)

(73) Assignee: Marel Stork Poultry Processing B.V., Boxmeer (NL)

( * ) Notice: Subject to any disclaimer, the term of this patent is extended or adjusted under 35 U.S.C. 154(b) by 0 days.

(21) Appl. No.: 15/302,050

(22) PCT Filed: Apr. 7, 2015

(86) PCT No.: PCT/NL2015/050223
§ 371 (c)(1),
(2) Date: Oct. 5, 2016

(87) PCT Pub. No.: WO2015/156668
PCT Pub. Date: Oct. 15, 2015

(65) Prior Publication Data
US 2017/0119000 A1    May 4, 2017

(30) Foreign Application Priority Data
Apr. 10, 2014    (NL) ..................... 2012600

(51) Int. Cl.
*A22B 3/00*    (2006.01)
*A22B 3/08*    (2006.01)
*A22B 7/00*    (2006.01)

(52) U.S. Cl.
CPC .............. *A22B 3/005* (2013.01); *A22B 3/086* (2013.01); *A22B 7/001* (2013.01)

(58) Field of Classification Search
CPC ............................... A22B 3/00; A22B 3/005
USPC ..................................... 452/57, 66
See application file for complete search history.

(56) References Cited

U.S. PATENT DOCUMENTS

| | | | |
|---|---|---|---|
| 5,643,072 A | | 7/1997 | Lankhaar et al. |
| 6,126,534 A | * | 10/2000 | Jacobs ..................... A22B 3/00 452/66 |
| 6,135,872 A | * | 10/2000 | Freeland .............. A01K 45/005 452/57 |

(Continued)

FOREIGN PATENT DOCUMENTS

| | | |
|---|---|---|
| EP | 0954224 B1 | 9/2002 |
| NL | 1018486 C2 | 3/2003 |
| WO | 9415469 A1 | 7/1994 |

*Primary Examiner* — Richard T Price, Jr.
(74) *Attorney, Agent, or Firm* — The Webb Law Firm

(57) ABSTRACT

The invention relates to a stunning device (1) for poultry, having an elongated stunning space (2) with a poultry feed opening and a poultry discharge opening which elongated stunning space is subdivided in at least two connecting compartments, a controlled anaesthetic gas feed connecting to the elongated stunning space, and a conveyer (9) leading through the elongated stunning space providing a transportation path for the poultry, wherein at least one side of the elongate stunning space is connecting to a transition compartment. The invention also provides a method of operating such a stunning device.

15 Claims, 4 Drawing Sheets

(56) References Cited

U.S. PATENT DOCUMENTS

| | | | |
|---|---|---|---|
| 7,097,552 B2 * | 8/2006 | Ovesen .................... | A22B 3/00 |
| | | | 452/53 |
| 7,331,848 B2 * | 2/2008 | Zachariassen ........... | A22B 3/00 |
| | | | 452/66 |
| 7,448,943 B1 * | 11/2008 | Woodford .............. | A22B 3/005 |
| | | | 452/66 |
| 8,444,459 B2 * | 5/2013 | Van Den Griend ... | A22C 21/04 |
| | | | 452/77 |

* cited by examiner

This application is the United States national phase of International Application No. PCT/NL2015/050223 filed Apr. 7, 2015, and claims priority to The Netherlands Patent Application No. 2012600 filed Apr. 10, 2014, the disclosures of which are hereby incorporated in their entirety by reference.

BACKGROUND OF THE INVENTION

Field of the Invention

The invention relates to a device for stunning poultry, comprising an elongated stunning space with a feed opening and a poultry discharge opening for poultry which elongated stunning space is subdivided in at least two connecting compartments, a controlled anaesthetic gas feed connecting to the elongated stunning space and a conveyer leading through the elongated stunning space providing a transportation path for the poultry. The invention also relates to a method of operating a stunning device according any of the preceding claims for stunning poultry, the method comprising the operating steps: A) feeding poultry to be processed to the elongated stunning space which elongated stunning space is subdivided in compartments, B) transporting the poultry through the subsequent compartments of the elongated stunning space while feeding anaesthetic gas to the elongated stunning space, and C) removing the stunned poultry out of the elongated stunning space.

Description of Related Art

A method and device for stunning are for instance known from EP 0 954 224. In this patent is disclosed an improved method and apparatus for anaesthetizing animals for slaughter with gas. The animals for slaughter are transported through a gas filled anaesthetizing space wherein a controllable and continuous gas flow parallel to the transporting direction is established.

Although the prior art methods and devices provides a sufficient stunning the object of the invention is to provide an improved method and device for stunning poultry with enhanced control of the stunning process.

SUMMARY OF THE INVENTION

To realise such objects the invention provides a device for stunning poultry, comprising: an elongated stunning space with a poultry feed opening and a poultry discharge opening which elongated stunning space is subdivided in at least two connecting compartments, a controlled anaesthetic gas feed connecting to the elongated stunning space, a conveyer leading through the elongated stunning space providing a transportation path for the poultry, wherein at least one of the openings of the elongate stunning space connects to a transition compartment, through which transition compartment the conveyor leading through the elongated stunning space is also leading through, and which transition compartment is provided with a gas feed and a gas discharge that are spaced apart. In an embodiment of such stunning device both, the poultry feed opening and the poultry discharge opening of the elongate stunning space, connect to a transition compartment, thus such a stunning device comprises an entrance transition compartment and an exit transition compartment so that the poultry feed opening and the poultry discharge opening each connect to a separate transition compartment.

An advantage of the stunning device according the present invention is that the gas flow in the transition compartment creates a barrier (a "gas curtain") that shields the adjoining opening of the elongate stunning space and thus prevents an uncontrolled outflow of stunning gas out of the elongate stunning space. The barrier provided by the gas flow in the transition compartment enables an improved control on the stunning gas conditions in the elongate stunning space which supports the robustness of the stunning process and an more controlled and gentle processing of the poultry. The result of a gentle processing is, among others, less injuries (e.g. lower percentages of wing breakage). The barrier provided by the gas flow in the transition compartment also results in a limitation in the stunning gas consumption compared to the prior art gas stunning devices. The elongated stunning space is a closed system with only two apertures for stunning gas discharge: the poultry feed opening and the poultry discharge opening. Such construction will result in that the stunning gas of any central located compartment(s) can only leave this (such) central located compartment(s) via adjoining compartments. The anaesthetic gas is thus efficiently used in the stunning device of the invention.

A further advantage is that at the entrance transition compartment the poultry may at least partially be cleaned, for instance dust, loose feathers and other loose pollutants may be blown off by the gas circulating in the entrance transition compartment before the poultry is entering the elongate stunning space. This leads to an enhanced hygiene of the stunning process as well as to less contamination of the stunning device. Yet another advantage may be that at the exit transition compartment the poultry may be blown off after passage of the elongate stunning space, which at least partially removes stunning gasses of the stunned poultry. Blowing off the stunned poultry limits the pollution of the environment with stunning gasses, thus enhancing the working conditions for the operators handling the stunning device. As for the spaced apart gas feed and gas discharge positive results are recorded during testing with a spacing apart over a substantial distance, e.g. a distance of 300-900 mm, preferably 400-800 mm, more preferably 500-700 mm. In the scope of the present invention "poultry" is to be understood as a generic term for all types of fowl that are industrially processed, like for instance chicken, duck and turkey. The separation of the compartments may be realised with various features like physical curtains and/or gas curtains.

The gas feed of a transition compartment may comprise an air feed. In this respect air can be outside air but can also be conditioned air. Air is a gas that can be provided at low cost and is not contaminating the environment.

To enable to subdivide the stunning process in more than two stunning phases the elongated stunning space may be subdivided in three, or more than three, connecting compartments at least one of them, but preferably more than one. One or more of the gas connections may be individually controlled to further enhance the control facilities of the stunning device.

As to prevent unwanted mixing of the gas mixtures of connecting compartments, the connecting compartments are at least partly screened off from each other. Features for screening off may be physical curtains and/or gas curtains.

The conveyor for poultry transportation may be a flat belt but it is also possible to use a chain belt for instance to enable gas passage through the belt.

Both the gas feed and the gas discharge may connect to the top side of the transition compartment. In an embodiment of the stunning device according the present invention the gas feed is located on the side of the gas discharge that is faced away from the elongate stunning space, leading to an effective barrier effect of the gas flow in the transition compartment.

The gas feed may open with a slotted feed opening to the transition compartment, which slotted feed opening has a width that substantially corresponds to the width of the transition compartment. Such slot like opening (like a letterbox slot) results in the feed of gas to a compartment over the width of such compartment thus also being supportive for even gas flow conditions. The gas discharge may connect with plural smaller openings (or as an alternative with a maze structure) to the transition compartment to prevent debris to enter the gas discharge channel.

The width of the elongate stunning space and the at least one connecting transition compartment may—in an embodiment—be at least 2.7 m., enabling not only the stunning of poultry that is loose in the stunning device, but also the stunning of poultry that contained is in cages/drawers, e.g. the cages/drawers in which poultry is transported to a slaughterhouse.

To further enhance the barrier to the outflow of stunning gas from the elongate stunning space a transition compartment may be separated from the elongated stunning space with a curtain. An example may be a flexible physical curtain and/or an additional gas curtain.

The gas feed and the gas discharge may be connected to a fan which fans are synchronised. Such fans thus function as a blower and an extractor and may create a gas flow in a transit compartment that results in more or less equal gas flow pattern in the transit compartment.

The elongated stunning space and the conveyer may both have a modular construction. By adding or removing one or more parts (modules) of the housing of the elongate stunning space it is possible to extend/shorten the length of the elongated stunning space. At the same way parts (modules) of the conveyer can be added or removed enabling to amend the length of the conveyor. In combination with steering of the transportation speed of the poultry through the elongate stunning space, such modular construction enables to adapt the stunning capacity of the stunning device as well as the exchange of equipment parts.

Except for the poultry feed opening, the poultry discharge opening and the anaesthetic gas feed the elongated stunning space may preferably be constructed a gas tight structure (e.g. in the shape of a tunnel).

The conveyor of the present stunning device may have a flat carrying surface. Different from the prior art gas stunning devices the conveyor does not have to be provided with a lower intermediate part. The flat carrying surface may be horizontal and/or may run in a straight line. As the transition compartment(s) prevent uncontrolled outflow of stunning gas the problem of stunning gasses (normally heavier than air) it is now possible to transport the poultry in a straight line (plane) which enables a simpler construction of the stunning device that is less sensitive to disruption of the stunning process due to uncontrolled outflow of stunning gas without a deepened positioning of the conveyor at the location where the stunning gas acts on the poultry.

For an even stunning gas distribution the anaesthetic gas feed may connect to the elongated stunning space via tubes provided with spaced apart openings. The tubes may be connected to the upper side of the elongate stunning space. In a simple but effective embodiment the tubes are metal pipes, in which pipes simple apertures are arranged. In case plural gasses are used in a single compartment a gas connection to such a compartment may be provided with an intermediate mixing and pressure distribution chamber. The openings in the gas feeding tubes may be located in the upper half side of the tubes. Such positioning of the apertures in the tubes results in an effective gas circulation in a compartment of the elongate stunning space. In an embodiment the apertures are pointing upwards under an angle with the horizontal of more than 10°, preferably under an angle with the horizontal of 10°-20°. Due to such gas feeding tubes a relative even (constant) gas distribution in a compartment can be realised so that there is few difference in the gas conditions on different locations in a compartment. As a result the gas mixture conditions in the compartment will be relatively uniform which is also favourable for the control of operating the stunning device. So a further advantage of the invention is that the gas consumption (and more specific the anaesthetic gas consumption) of a stunning device (e.g. when calculated per poultry weight) can be very efficient as no "overkill" (or only minimal "overkill") in the gas conditions in the compartments have to be realised; thus the cost of ownership of the stunning device may be lower than the prior art stunning devices.

For optimal control of the gas conditions in the compartments of the elongate stunning space each of the compartments of the elongated stunning space may comprise a gas feed. The elongated stunning space may be subdivided in at least two, or at least three connecting compartments each provided with individually controlled gas feeds and the compartments of the stunning device may each be provided with at least one condition sensor for measuring gas mixture conditions in the compartments. The sensors are preferably to be connected with an intelligent control unit, so that dependent on the measured values the feed of the stunning gas(ses) can be changed. Preferably the compartments of the stunning device are each provided with at least one condition sensor for measuring gas mixture conditions in each of the compartments. Such a condition sensor could be a concentration sensor sensitive for one or more gas mixture components in the stunning device and/or a composition sensor for measuring the relative concentrations of various gas mixture components.

Alternatively, or in addition, the intelligent control unit may be provided with data on the meat quality of the poultry so that the feed of the stunning gas may be changed dependant on the detected meat quality. Such meat quality data may, for example, be the concentration of blood spots and/or the tenderness of the meat and is collected (detected) from the poultry meat after the stunned poultry has been slaughtered.

As a further option, the intelligent control unit may be provided with data on the behaviour of the poultry during stunning. When the birds are experiencing discomfort and/or stress before and/or during the stunning process the feed of the stunning gas may be changed in order to alleviate or compensate this. Behaviour of the poultry may be determined by visual inspection through porthole windows provided in the stunning device. In an embodiment one or more of the compartments of the stunning device is provided with at least one porthole window. Porthole windows in the stunning device may also be used for visual inspection of the stunning process in general.

At least one of the compartments may be provided with a controlled air feed. The opportunity to feed air to one or more of the compartments seems in first instance contra-productive but it has a positive effect on the control of the stunning device. It enables to decrease to high anaesthetic gas concentrations when they occur due to the efficient use of the anaesthetic gas. For instance when the inflow of gas mixture from an adjoining compartment could result in that a specific gas mixture concentration (like for instance $CO_2$ concentration) is above a desired concentration level. This can then be counteracted by feeding air to the compartment with the high gas component concentration, so to rarefy the excess gasses (e.g. the anaesthetic gas).

The connecting compartments of the elongated stunning space may at least partly be screened off from each other to enable even better control of the gas conditions in the individual compartments. The connecting compartments form an elongated stunning space that may have a mutual housing. The mutual housing may be embodied as a hood covering a conveyor leading through the mutual housing for the poultry transportation. It is also possible to make such mutual housing liftable in respect to the conveyor so to enable easy opening of the stunning device e.g. for cleaning and maintenance. In an embodiment elongate stunning space may have an open underside which connects to the conveyor, or a closed conveyor carrying structure, which allows the elongate stunning space to be lifted from the conveyor. The device according the invention may also be provided with a lift structure (e.g. hydraulic or pneumatic cylinders) to enable easy lifting of the tunnel. Such liftable elongate stunning space structure enable easy access to the inside of the stunning space for e.g. cleaning and repair of the stunning device)

The invention also provides a method of operating a stunning device for stunning poultry as disclosed in the previous paragraphs, the method comprising the operating steps: A) feeding poultry to be processed to the elongated stunning space which elongated stunning space is subdivided in compartments, B) transporting the poultry through the subsequent compartments of the elongated stunning space while feeding anaesthetic gas to the elongated stunning space, and C) removing the stunned poultry out of the elongated stunning space, wherein the poultry that is fed to and/or removed from the elongate stunning space though at least one transition compartment, in which transition compartment a gas flow is created leading from the gas feed to the gas discharge. Preferably the poultry that is fed to and removed from the elongate stunning space though both a first "entrance" transition compartment and a second "exit" transition compartment. With this method the advantages may be realised as presented above in relation to the stunning device according the present invention and which are incorporated here in relation to the stunning method according the present invention by reference.

A gas condition may be detected in each of the compartments, and the detected gas condition measurements may be used to control anaesthetic gas feeds to the compartments. To enable better process control the gas mixture condition may be detected in each of the compartments, and the detected gas mixture condition measurements are used to control gas feeds to the compartments of the elongated stunning space. Detection of gas conditions can be used for process control according the present invention. An example is for instance the measurement of specific gas concentrations (e.g. $CO_2$, $N_2$ and/or $O_2$ concentration measurements). The anaesthetic gas fed to the elongated stunning space may only leave via the poultry feed opening and the poultry discharge opening.

The stunning time of the poultry is may be adjusted by controlling the speed of the conveyor belt. A more structural stunning time adjustment may be realised by extending or limiting the length of the elongate stunning space (e.g. by adding o removing modules of the elongate stunning space).

For even better process control it is positive if and when the load of a transporting device for transporting the poultry through the elongated stunning space may be measured for determining the poultry load of the stunning device. Dependent on the poultry load the gas mixture conditions may then be adapted to optimise the stunning process.

BRIEF DESCRIPTION OF THE DRAWINGS

The invention is further elucidated on the basis of the non-limitative exemplary embodiment shown in the following figures. Herein shows.

DESCRIPTION OF THE INVENTION

Figure 1:
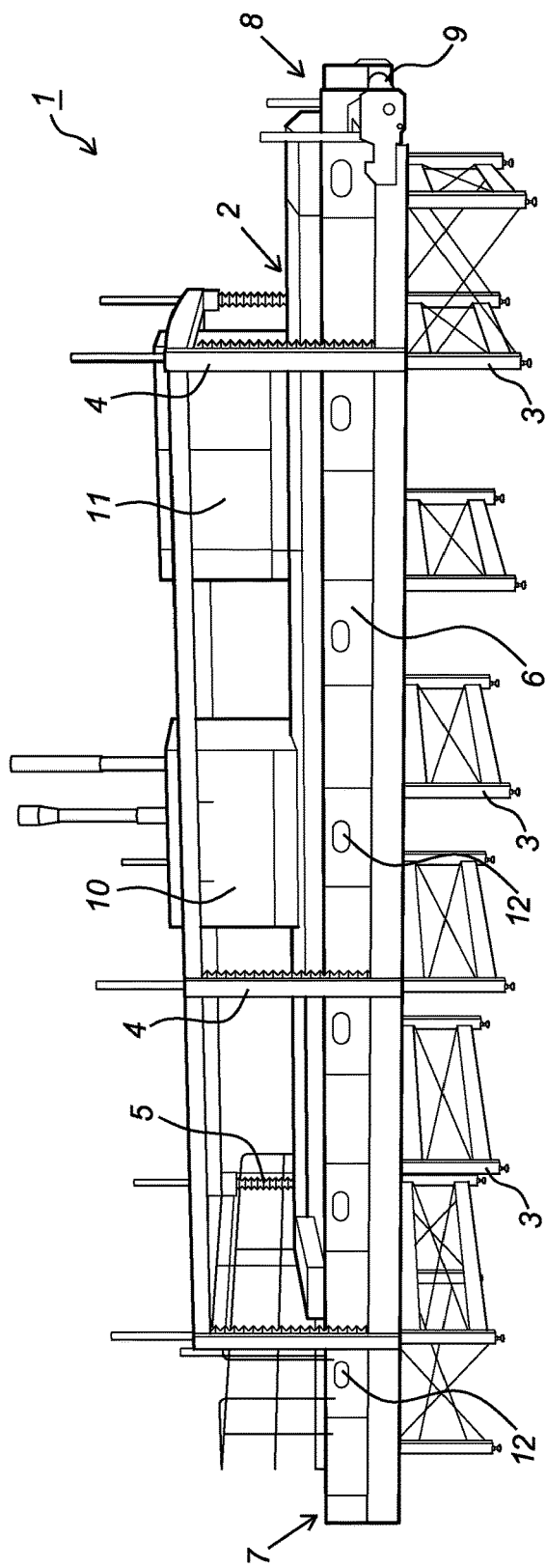
FIG. 1 a perspective view on a stunning device according the invention.

FIG. 1 shows an perspective view on a stunning device 1 with an elongated stunning space 2 that is carried by a frame 3. The frame 3 has stand 4 in which spindles 5 are integrated. The upper side of the elongated stunning space 2 is embodied as an elongate hood 6 which can be lifted by the spindles 5 in the stands 4 of the frame 3. The elongate hood 6 of the stunning device 1 is provided with porthole windows 12.

Figure 5:
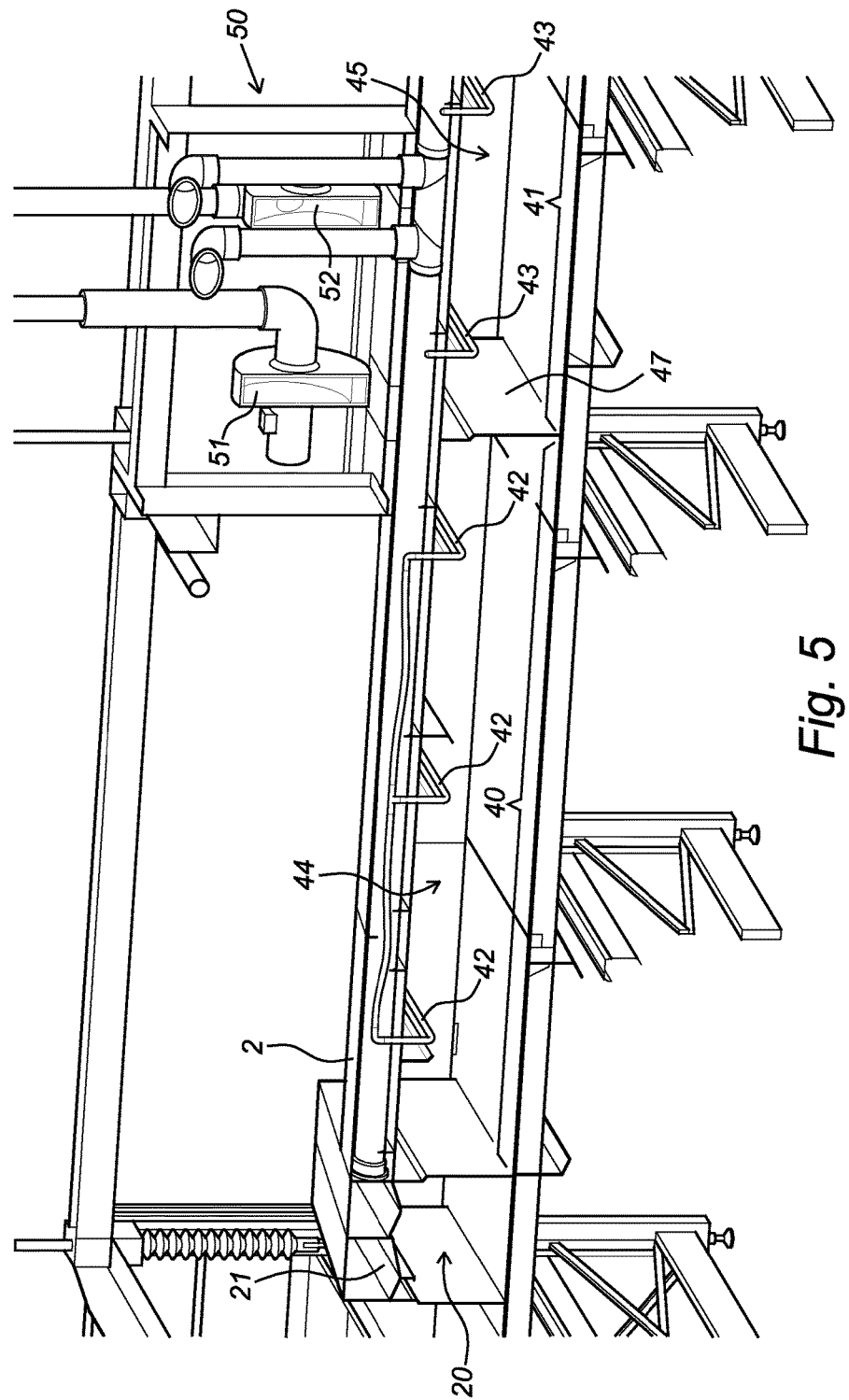
FIG. 5 a perspective views on a part of the interior of the stunning device according FIGS. 1 and 2 showing the transition compartment of FIG. 3 and a full compartment of the elongated stunning space.

The stunning device 1 has a feed opening 7 for poultry to be stunned and on the opposite side of the elongated stunning space 2 a discharge opening 8 for the stunned poultry. On the lower side of the elongated stunning space 2 and under the hood 5 is a conveyor 9—which is better visible in the subsequent figures—for leading the poultry though the elongated stunning space 2. On the top of the hood 5 forming the top of the elongated stunning space 2 a fan housing 10 is shown, the inside of which is depicted in FIG. 5, as well a housing 11 for an operating system.

Figure 2:
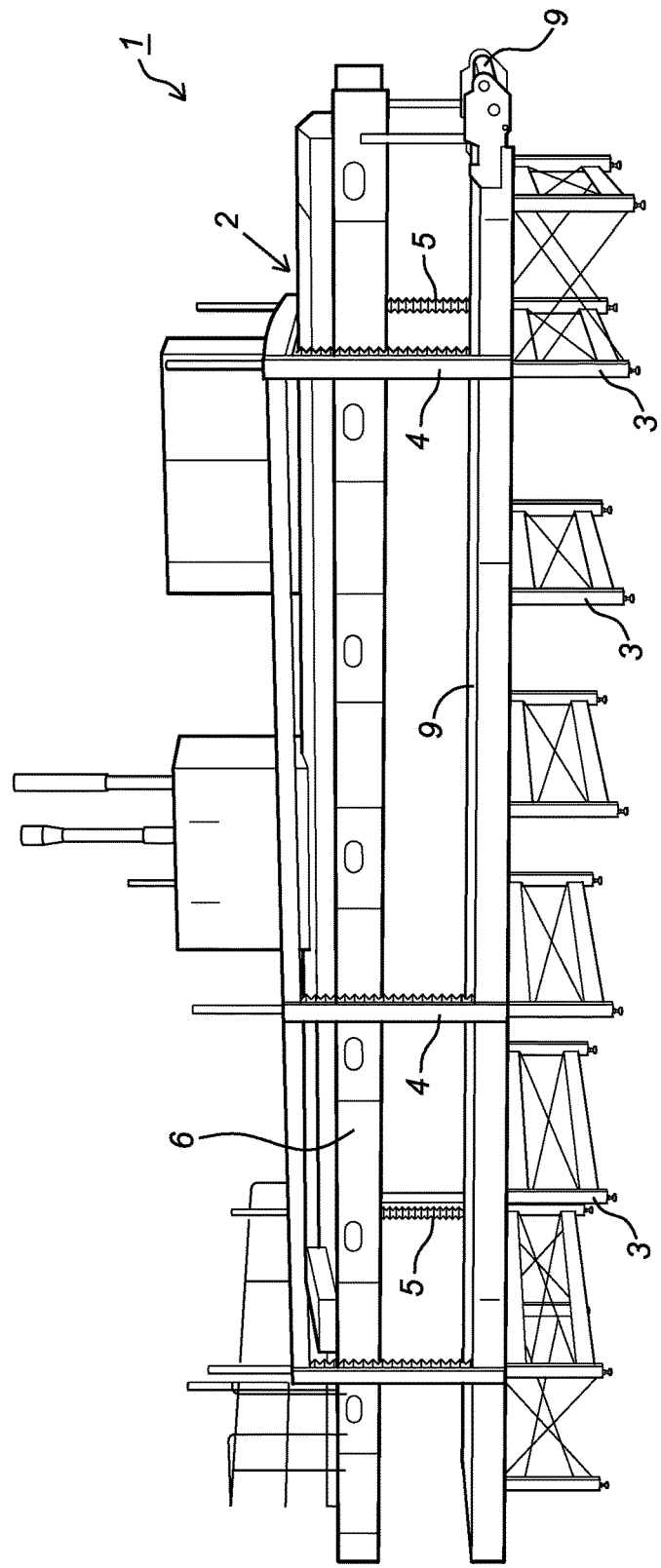
FIG. 2 a perspective view on the stunning device of FIG. 1 in an open position.

In FIG. 2 the stunning device 1 of FIG. 1 is depicted in a position wherein the hood 5 of the elongated stunning space 2 is lifted by the spindles 6 in the stands 4 of the frame 3 thus providing access to, among others, the conveyor 9 located under the hood 5.

Figure 3:
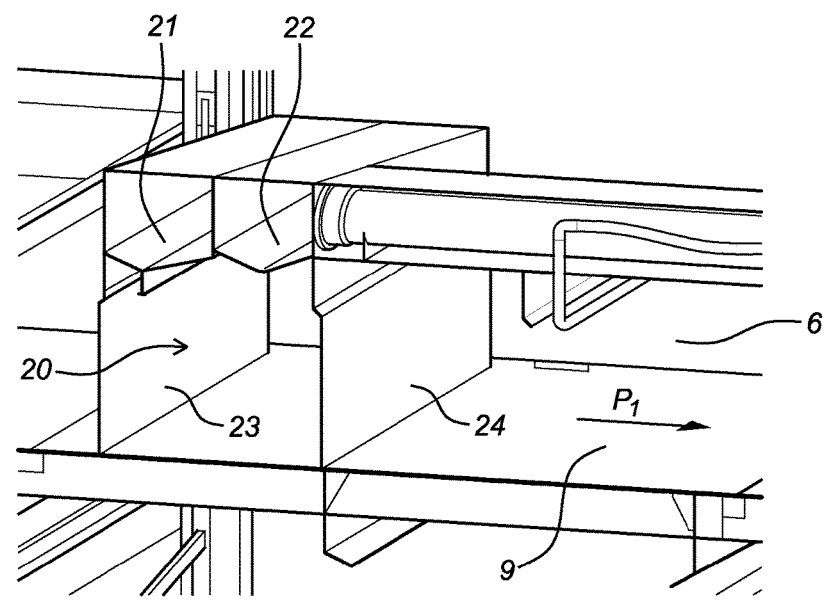
FIG. 3 a perspective views on a part of the interior of the stunning device according FIGS. 1 and 2 showing a transition compartment and a part of the elongated stunning space.

In FIG. 3 a cut away part of the stunning device 1 is shown wherein a transition compartment 20, through which transition compartment 20 the conveyor 9 leading through the elongated stunning space 6 is also leading through. The transition compartment 20 is provided with a gas feed 21 and a gas discharge 22 that are spaced apart. The poultry to be stunned will enter the transition compartment 20 that is shielded from the environment by a flexible cover 23 (curtain) according arrow $P_1$. The gas feed 21 connects to the top side of the transition compartment 20, has a slot shaped opening to the transition space and has a width that substantially corresponds to the width of the transition compartment 20. The gas blown in the transition compartment 20 via the gas feed 21 (e.g. air can be blown in) and that is sucked out of the transition compartment 20 via the gas discharge 22 generates a type of gas curtain which is an obstruction/barrier against uncontrolled the outflow of anaesthetic gas out of the elongate stunning space 2. As the elongated stunning space 2 is a gas tight structure in a closed position of the hood 6 (see FIG. 1) the only openings for leaving anaesthetic gas the elongate stunning space are the a feed opening 7 for poultry to be stunned and the discharge opening 8. The transition compartment 20 is shielded from the elongate stunning space with a second flexible curtain 24 as to further obstruct the outflow of anaesthetic gas from the elongate stunning space. Furthermore FIG. 3 shows that the conveyor 9 has a flat carrying surface that is impermeable for gasses thus also supports the gas curtain to be created in the transition compartment 20. Further effects of the gas flow generated in the transition compartment 20 are the partial cleaning of the poultry passing (blowing off dust and other loose particles) and preventing anaesthetic gas flowing uncontrolled to the environment. At the distal side of the elongated stunning space 2 is the poultry discharge opening 8 that is provided with an outlet transition compartment to be compared with the transition compartment 20 as shown in this figure as an entrance transition compartment 20.

Figure 4:
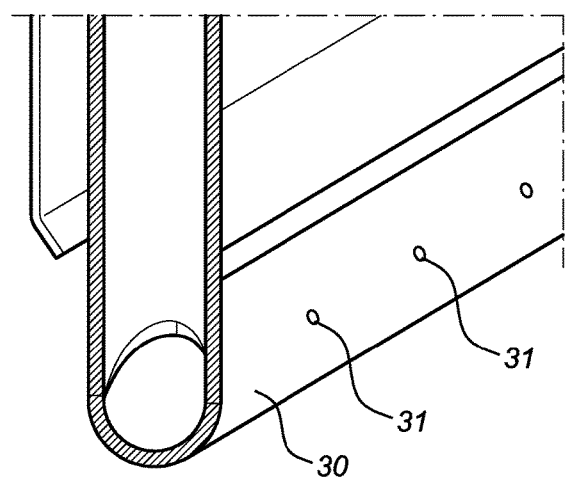
FIG. 4 a perspective views on an anaesthetic gas feed in the elongated stunning space of the stunning device as shown in the previous figures.

FIG. 4 shows a detailed perspective view on a part of the elongate stunning space 2 with a tube 30 for feeding anaesthetic gas. The effective part of tube 30 is in a direction perpendicular to the transporting direction of the poultry through the elongate stunning space 2 The tube 30 is located on the top of the elongate stunning space 2 (see also FIG. 3) and is provided with spaced apart openings 31, which openings 31 in the tube 30 are located on the upper half side of the tube 30 there where the tube 30 is in a horizontal position. The anaesthetic gas flowing through the opening preferably has a speed of at least 50 m/s (e.g. even a speed of 100-200 m/s) so to support a good mixture of the gasses in the elongate stunning space 2.

FIG. 5 shows a perspective views on a part of the interior of the stunning device 1 according FIGS. 1 and 2 showing the transition compartment 20 of FIG. 3 and a part 40 (compartment 40) of the elongated stunning space 2 that is separated from subsequent compartment 41 of the elongate stunning space 2. All compartments 40, 41 of the elongated stunning space 2 comprise anaesthetic gas feeds 42, 43 embodied here as pipes 42, 43 with outflow openings (see FIG. 4). For conditioning the gas in a specific compartment 40, 41 the anaesthetic gas feeds 42, 43 may be controlled dependent on the gas conditions measure by sensors 44, 45. The connecting compartments 40, 41 of the elongated stunning space 2 are screened off from each other by again a flexible curtain 57. The elongated stunning space 2 may be subdivided in plural compartments (more than the two depicted in this figure).

Furthermore FIG. 5 also shows a double fan construction 50 on top of the hood 6 of the elongate stunning space 2. From one fan 51 air is pumped to the gas feed 21 of the transition compartment 20 and a second fan 52 sucks gas from the gas discharge 22 of the transition compartment 20. Not shown in this figure is that the fans 51, 52 may also be connected with a second transition compartment on the side (poultry discharge side) of the elongate stunning space 2 that is face away from the transition compartment 20 (poultry entrance side). The operation of the fans 51, 52 may be coupled or synchronised on another way than by direct (hard) coupling.

The invention claimed is:

1. A device for stunning poultry, comprising:
   an elongated stunning space with a poultry feed opening and a poultry discharge opening which elongated stunning space is subdivided in at least two connecting compartments,
   a controlled anaesthetic gas feed connecting to the elongated stunning space,
   a conveyer leading through the elongated stunning space providing a transportation path for the poultry,
   wherein at least one of the openings of the elongated stunning space connects to a transition compartment, through which transition compartment the conveyor leading through the elongated stunning space is also leading through, and which transition compartment is provided with a gas feed and a gas discharge that are spaced apart, and
   wherein a gas flow between the gas feed and the gas discharge in the transition compartment creates a gas curtain that shields the adjoining opening of the elongated stunning space and thus prevents an uncontrolled outflow of stunning gas from the elongated stunning space.

2. The stunning device according to claim 1, wherein both the poultry feed opening and the poultry discharge opening of the elongated stunning space connect to a transition compartment.

3. The stunning device according to claim 1, wherein the gas feed of a transition compartment is an air feed.

4. The stunning device according to claim 1, wherein both the gas feed and the gas discharge connect to the top side of the transition compartment.

5. The stunning device according to claim 1, wherein the gas feed opens with a slotted feed opening to the transition compartment, which slotted feed opening has a width that substantially corresponds to the width of the transition compartment.

6. The stunning device according to claim 1, wherein a transition compartment is separated from the elongated stunning space with a curtain.

7. The stunning device according to claim 1, wherein the gas feed and the gas discharge are connected to a fan which fans are synchronised.

8. The stunning device according to claim 1, wherein the anaesthetic gas feed connects to the elongated stunning space via tubes provided with spaced apart openings.

9. The stunning device according to claim 8, wherein the openings in the gas feeding tubes are located in the upper half side of the tubes.

10. The stunning device according to claim 1, wherein each of the compartments of the elongated stunning space comprises a gas feed.

11. The stunning device according to claim 1, wherein the elongated stunning space is subdivided in at least three connecting compartments each provided with individually controlled gas feeds.

12. The stunning device according to claim 1, wherein the compartments of the stunning device are each provided with at least one condition sensor for measuring gas mixture conditions in the compartments.

13. The stunning device according to claim 1, wherein at least one of the compartments is provided with controlled air feeds.

14. A method of operating a stunning device comprising the operating steps:
   A) feeding poultry to be processed to an elongated stunning space which elongated stunning space is subdivided into compartments,
   B) transporting the poultry through the subsequent compartments of the elongated stunning space while feeding anaesthetic gas to the elongated stunning space, and
   C) removing the stunned poultry out of the elongated stunning space,
   wherein the poultry that is fed to and/or removed from the elongated stunning space passes through at least one transition compartment, in which transition compartment a gas flow is created leading from a gas feed to a gas discharge, and
   wherein the gas flow between the gas feed and the gas discharge in the transition compartment creates a gas curtain that shields an adjoining opening of the elongated stunning space and thus prevents an uncontrolled outflow of stunning gas from the elongated stunning space.

15. The method according to claim 14, wherein a gas condition is detected in each of the compartments, and the detected gas condition measurements are used to control anaesthetic gas feeds to the compartments.

* * * * *